US010204084B2

(12) United States Patent
Qadir et al.

(10) Patent No.: US 10,204,084 B2
(45) Date of Patent: Feb. 12, 2019

(54) ACTIVITY MODELING IN EMAIL OR OTHER FORMS OF COMMUNICATION

(71) Applicant: Microsoft Technology Licensing, LLC, Redmond, WA (US)

(72) Inventors: Ashequl Qadir, Melrose, MA (US); Michael Gamon, Seattle, WA (US); Patrick Pantel, Bellevue, WA (US); Ahmed Hassan Awadallah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 15/289,918

(22) Filed: Oct. 10, 2016

(65) Prior Publication Data

US 2017/0359291 A1    Dec. 14, 2017

Related U.S. Application Data

(60) Provisional application No. 62/348,655, filed on Jun. 10, 2016.

(51) Int. Cl.
| | |
|---|---|
| *G06F 15/16* | (2006.01) |
| *G06F 17/21* | (2006.01) |
| *G06F 17/27* | (2006.01) |
| *H04L 12/58* | (2006.01) |

(52) U.S. Cl.
CPC ........ *G06F 17/218* (2013.01); *G06F 17/2785* (2013.01); *H04L 51/14* (2013.01); *H04L 51/18* (2013.01)

(58) Field of Classification Search
CPC ..... H04L 51/16; H04L 51/046; G06F 17/128; G06F 17/2715; G06F 17/2785

USPC .................................................. 709/206, 224
See application file for complete search history.

(56) References Cited

U.S. PATENT DOCUMENTS

| | | |
|---|---|---|
| 7,765,212 B2 | 7/2010 | Surendran et al. |
| 8,024,411 B2 | 9/2011 | Pulfer et al. |
| 8,103,726 B2 | 1/2012 | Stoddard et al. |
| 8,635,285 B2 | 1/2014 | D'Amato et al. |
| 9,165,259 B2 | 10/2015 | Flinn et al. |
| 2006/0168040 A1 | 7/2006 | Kushmerick et al. |

(Continued)

OTHER PUBLICATIONS

Ayodele et al., "Email Classification and Summarization: A Machine Learning Approach", In Proceedings of IET Conference on Wireless, Mobile and Sensor Networks, Dec. 12, 2007, 4 pages.

(Continued)

*Primary Examiner* — Philip B Tran
(74) *Attorney, Agent, or Firm* — Schwegman Lundberg & Woessner, P.A.

(57) ABSTRACT

This disclosure describes techniques and architectures that involve a latent activity model for workplace emails. Such a model is based, at least in part, on a concept that communications, such as email at a workplace, are purposeful and organized by activities. An activity is a set of interrelated actions and events around a common goal, involving a particular group of people, set of resources, and time framework, for example. The latent activity model involves a probabilistic inference in graphical models that jointly captures the interplay between latent activities and the email contexts governed by the emails. Such contexts may be email recipients, subject and body of the email, and so on.

20 Claims, 10 Drawing Sheets

(56) References Cited

U.S. PATENT DOCUMENTS

| | | | |
|---|---|---|---|
| 2007/0156732 A1* | 7/2007 | Surendran | G06Q 10/107 |
| 2009/0077027 A1* | 3/2009 | King | G06Q 10/00 |
| 2012/0254094 A1* | 10/2012 | Flinn | G06N 7/02 706/52 |
| 2012/0260188 A1 | 10/2012 | Park et al. | |
| 2013/0275429 A1* | 10/2013 | York | G06F 17/30029 707/737 |
| 2014/0074952 A1* | 3/2014 | White | G06Q 10/107 709/206 |
| 2014/0214976 A1 | 7/2014 | Zhou et al. | |
| 2015/0033141 A1 | 1/2015 | Mishra | |
| 2017/0032248 A1* | 2/2017 | Dotan-Cohen | G06N 5/02 |

OTHER PUBLICATIONS

Balakrishnan et al., "Fitting an Activity-Centric System into an Ecology of Workplace Tools," In Proceedings of the SIGCHI Conference on Human Factors in Computing Systems, Apr. 10, 2010, pp. 787-790.

Balasubramanyan et al., "Block-LDA: Jointly Modeling Entity-Annotated Text and Entity-Entity Links," In Proceedings of the Eleventh SIAM International Conference on Data Mining, vol. 11, Apr. 28, 2011, pp. 450-461.

Bellotti et al., "Taking Email to Task: The Design and Evaluation of a Task Management Centered Email Tool," In Proceedings of the SIGCHI Conference on Human Factors in Computing Systems, vol. 5, Issue 1, Apr. 5, 2003, pp. 345-352.

Blei et al., "Latent Dirichlet Allocation," In Journal of Machine Learning Research, vol. 3, Mar. 1, 2003, pp. 993-1022.

Carvalho et al., "Recommending Recipients in the Enron Email Corpus," In Technical Report CMU-LTI-07-005, Retrieved on Jun. 7, 2016, 10 pages.

Desai et al., "Email Recipient Prediction Using Reverse Chronologically Arranged Implicit Groups", In Proceedings of Seventh International Conference on Contemporary Computing, Aug. 7, 2014, pp. 1-6.

Dey, et al., "Email Analytics for Activity Management and Insight Discovery", In Proceedings of the IEEE/WIC/ACM International Joint Conferences on Web Intelligence (WI) and Intelligent Agent Technologies, Nov. 17, 2013, pp. 557-564.

Dredze et al., "Automatically Classifying Emails into Activities," In Proceedings of International Conference on Intelligent User Interfaces, Jan. 29, 2006, pp. 70-77.

Dredze et al., "Generating Summary Keywords for Emails Using Topics," In Proceedings of the 13th International Conference on Intelligent User Interfaces, Jan. 13, 2008, pp. 199-206.

Dredze et al., "User models for email activity management," In Proceedings of the 5th International Workshop on Ubiquitous User Modeling, Jan. 13, 2008, 3 pages.

Elsayed et al., "Resolving Personal Names in Email Using Context Expansion," In Proceedings of 46th Annual Meeting of the Association for Computational Linguistics: Human Language Technologies, Jun. 2008, pp. 941-949.

Graus et al., "Recipient Recommendation in Enterprises using Communication Graphs and Email Content", In Proceedings of the 37th international ACM SIGIR conference on Research & development in information retrieval, Jul. 6, 2014, pp. 1079-1082.

Hu, et al., "Towards building effective email recipient recommendation service", In Proceedings of IEEE International Conference on Service Operations and Logistics, and Informatics, Jul. 8, 2012, pp. 398-403.

Huang et al., "A Link Prediction Approach to Anomalous Email Detection," In Proceedings of IEEE International Conference on Systems, Man and Cybernetics, vol. 2, Oct. 8, 2006, pp. 1131-1136.

Khoussainov et al., "Email Task Management: An Iterative Relational Learning Approach," In Proceedings of Second Conference on Email and Anti-Spam, Jul. 21, 2005, 8 pages.

Kushmerick et al., "Activity-Centric Email: A Machine Learning Approach", In Proceedings of the Twenty-First National Conference on Artificial Intelligence and the Eighteenth Innovative Applications of Artificial Intelligence Conference, Jul. 16, 2006, pp. 1634-1637.

Kushmerick, et al., "Automated Email Activity Management: An Unsupervised Learning Approach", In Proceedings of the 10th International Conference on Intelligent User Interfaces, Jan. 9, 2005, pp. 67-74.

McCallum, et al., "Topic and Role Discovery in Social Networks", In Proceedings of Nineteenth International Joint Conference on Artificial Intelligence, Jul. 30, 2005, 7 pages.

Minkov, et al., "Activity-centred Search in Email", In Proceedings of the Fifth Conference on Email and Anti-Spam, Aug. 21, 2008, 8 pages.

Moran, "Unified Activity Management: Explicitly Representing Activity in Work-Support Systems", In Proceedings of the European Conference on Computer-Supported Cooperative Work, Workshop on Activity: From Theoretical to a Computational Construct, Sep. 20, 2005, pp. 1-10.

Navaroli, et al., "Statistical Models for Exploring Individual Email Communication Behavior", In Proceedings of Fourth Asian Conference on Machine Learning, Nov. 4, 2012, 16 pages.

Nguyen, et al., "Social Networks Analysis based on Topic Modeling", In Proceedings of IEEE RIVF International Conference on Computing and Communication Technologies, Research, Innovation, and Vision for the Future, Nov. 10, 2013, pp. 119-122.

Pal, et al., "CC Prediction with Graphical Models", In Proceedings of Third Conference on Email and Anti-Spam, Jul. 27, 2006, 3 pages.

Pal, et al., "Transfer Learning for Enhancing Information Flow in Organizations and Social Networks", available at: <<https://people.cs.umass.edu/~mccallum/papers/darts-ceas07s.pdf>>, Massachusetts Univ Amherst Dept of Computer Science, Sep. 2007, 5 pages.

Quirk, et al., "MSR SPLAT, A Language Analysis Toolkit", In Proceedings of the 12th Annual Conference of the North American Chapter of the Association for Computational Linguistics, Human Language Technologies, Jun. 3, 2012, 21-24.

Seroussi, et al., "Authorship Attribution with Author-aware Topic Models", In Proceedings of the 50th Annual Meeting of the Association for Computational Linguistics: Short Papers, vol. 2, Jul. 8, 2012, 6 pages.

Shen, et al., "A Hybrid Learning System for Recognizing User Tasks from Desktop Activities and Email Messages", In Proceedings of the International Conference on Intelligent User Interfaces, Jan. 26, 2006, 7 pages.

Sofershtein, et al., "Predicting Email Recipients", In Proceedings of IEEE/ACM International Conference on Advances in Social, Aug. 25, 2015, 761-764.

Surendran, et al., "Automatic Discovery of Personal Topics to Organize Email", In Proceedings of Second Conference on Email and Anti-Spam, Jul. 2005, 6 pages.

Wang, et al., "Topics Over Time: A Non-Markov Continuous-Time Model of Topical Trends", In Proceedings of the 12th ACM SIGKDD international conference on Knowledge discovery and data mining, Aug. 20, 2006, pp. 424-433.

* cited by examiner

… (1)

ACTIVITY MODELING IN EMAIL OR OTHER FORMS OF COMMUNICATION

CROSS-REFERENCE TO RELATED APPLICATION

This application is related to and claims the benefit of U.S. Provisional Patent Application Ser. No. 62/348,655, filed on Jun. 10, 2016, entitled "Activity Modelling in Email", which is herein incorporated by reference in its entirety.

BACKGROUND

Activities are a prominent characteristic of a workplace, typically governed by people's job roles and work responsibilities. Examples of workplace activities include organizing a conference, purchasing equipment, managing candidate interviews, tracking customer leads, managing customer issues, managing software bugs, filing/approving expense reports, and so on. An activity can be viewed as a collaborative work practice involving a set of people, each playing a different role in the activity, for example.

Although emails are an integral part of workplace communication, current email clients generally offer less than adequate support for activity-oriented use of email. For example, email-based discussions may become split across long email threads and communications about multiple activities may become intermixed, leading to difficulties in managing the activities.

SUMMARY

This disclosure describes techniques and architectures that involve a latent activity model for workplace emails and other forms of electronic communications. Such a model is based, at least in part, on a concept that communications and collaborations, such as email at a workplace and co-authoring of documents, are purposeful and organized per activities. An activity may be considered to be a set of interrelated actions and events around a conunon goal, involving a particular group of people, set of resources, and time framework, for example. The latent activity model involves a probabilistic inference in graphical models that jointly captures the interplay between latent activities and email contexts governed by the emails. Such contexts may be email recipients, subject of the email, body of the email, time of day, location, and so on.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), quantum devices, such as quantum computers or quantum annealers, and/or other technique(s) as pemfitted by the context above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
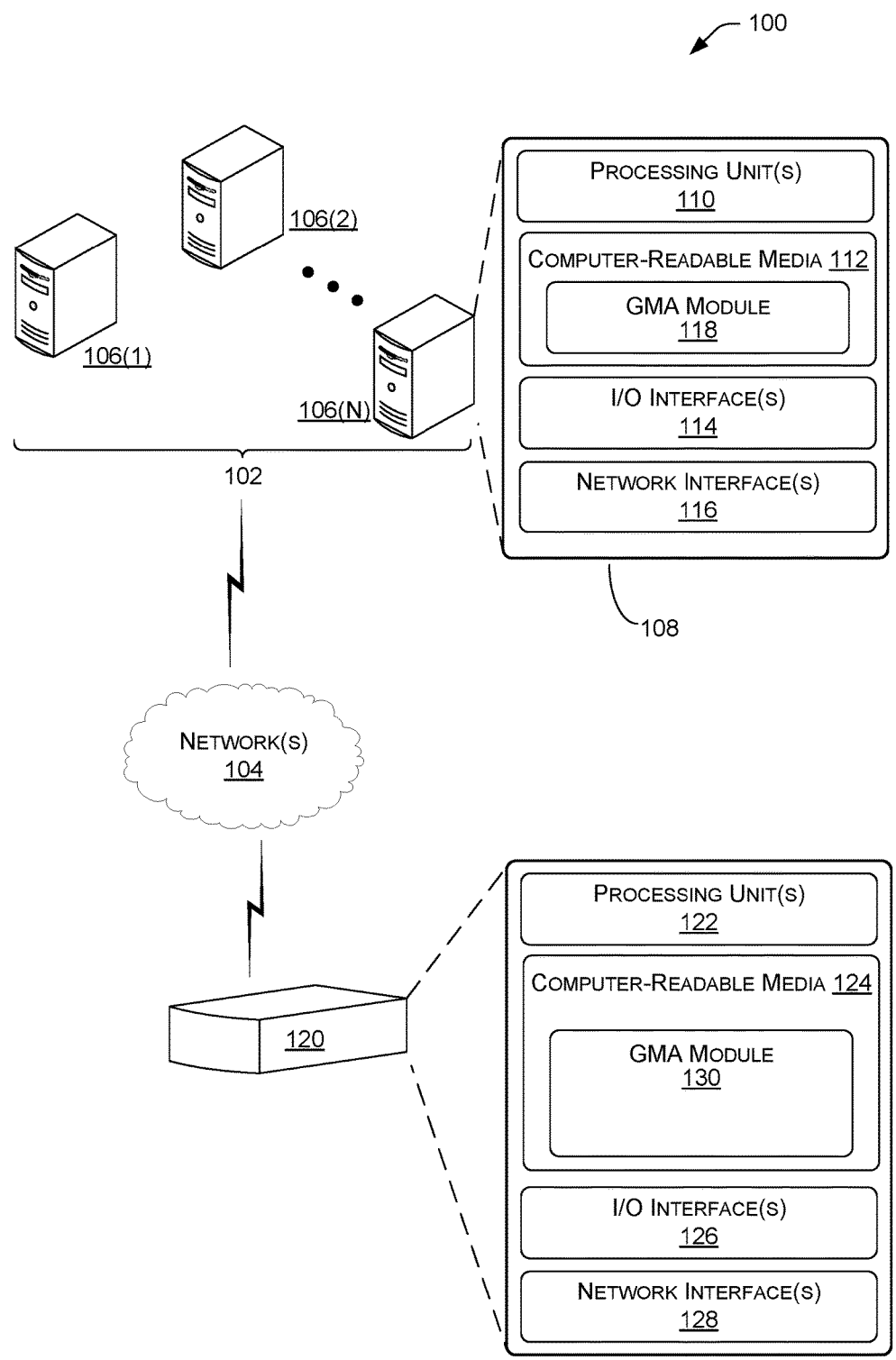
FIG. 1 is a block diagram depicting an enviromnent for modeling activities in email, according to various examples.

Techniques and architectures described herein involve a latent activity model for workplace emails and other forms of electronic communications. Such a model may be based, at least in part, on a concept that communications, such as email at a workplace and collaboration of a document, may be purposeful and organized by activities. An activity is a set of interrelated actions and events around a common goal, involving a particular group of people, set of resources, and time framework, for example. An activity is generally broader than a task and broader (but sometimes narrower) than a topic. Einails or other forms of messages may reflect the activities a user is engaged in. Such emails (e.g., electronic messages) or other communications may be associated with an activity even though a keyword search of these emails or other communications need not recognize the activity. For example, an email regarding "procuring an item from a vendor" (e.g., the activity) need not include any keywords such as "procure", "vendor", "purchase", "buy", and so on. Though a keyword analysis may be performed to determine an activity (or more than one activity), such an activity may be determined or discovered by any of a number of techniques described herein. In some cases, meetings may be a relatively important aspect of workplace activities. For example, a message or document may be a meeting invitation (e.g., associated with calendar entries) that includes a subject title, a body (e.g., such as in an email), and attendees/organizer/location information. Such a meeting invitation may be associated with any of a number of activities.

In some implementations, a computer system may perform a number of processes, such as automatically discovering a user's activities from a message (e.g., email, chat, voice message, etc.) and using the discovered activities to mine for tags (e.g., hashtaas), suggesting message recipients to a user drafting a recipient list for a message, summarizing communication, recommending content related to an activity (e.g. recommend documents, recommend messages to read before a meeting about a certain activity, and so on), and searching for content of such communication, just to name a few examples. In some examples, the discovered activities may be used to suggest labels/tags for emails (e.g., during composition of the emails). The computer system may use the discovered activities to suggest or list persons that may be experts in the field of the activities, and may suggest inclusion of email addresses of such persons into an email send-to list during composition time of email(s), for example. For example, information regarding experiences and talents of persons within, or external to, a company may be archived in memory. Such an archive of information may be searched for one or more persons that have experience or talent in the field of an activity beyond a threshold. In another example, the computer system may display, list, or otherwise provide relevant messages/communications related to an activity in response to a user looking up a meeting on the user's calendar. For instance, the activity may be associated with any of a number of aspects of the meeting. In yet another example, during compose time of a draft email (or other type of communication), the computer system may suggest a subject title for the email based, at least in part, on a discovered activity. Such suggestions may provide a number of benefits, such as providing improved productivity and efficiency for personal or work-place activities and communications. A computer system's ability to analyze relatively large amounts of communication-based information in a relatively short period of time may allow for the determination of activities to be useful in real-time to authors of communications, for example.

A description of a model that may be used by the computer system to perform such processes, among others, may involve unsupervised discovery of activities in email (or other form of communication) in a generative model, for example.

Although examples described herein are focused on emails, such examples and implementation may instead (or additionally) involve other forms of electronic communications, such as instant messaging, texting, social media posts, voice messages, video messages, and collaboration on documents (contracts, proposals, etc.), slides, worksheets, and so on. Thus, examples and implementations described herein may be applied to any form of electronic communication among one or multiple users. (In the case of a single user, the user may send messages to him/herself, such as for reminders, setting calendar events, and so on).

In some situations, "activities" may be narrower than a "topic". For a particular example, a topic (which may be discoverable in an email) is "email intent detection." Within that topic, there may be many different activities that involve different sets of recipients. One set of recipients may be associated with building email intent detectors within a given tool X (e.g., conversations involving members of a team that builds that tool). Another set of recipients may be associated with team member discussions about building email intent models for languages other than English. Still another set of recipients may be associated with conversations involving a product team A on plans to productize these models in a product AA. And yet another set of recipients may be associated with conversations with another product team B on plans to productize a product BB.

In other situations, "activities" may be broader than a "topic". For a particular example, a topic (which may be discoverable in an email) is "intern application." This topic may characterize emails which are part of a larger activity (e.g., which involves people on a team as well as some human resources personnel who coordinate a hiring process). This fairly broad activity may also contain emails about offer letters, accommodation, visa issues etc.

In some situations, considering activities over topics may provide a number of advantages. For example, a determination of topics may entirely rely on words in an email body/subject, but a determination of activities may rely on both the content (e.g., body/subject) and the people listed in an address list of the email. For example, email conversations among users discussing a patent application may likely all have the word "disclosure," and a topic model may discover the "disclosure" topic. Consider the case where one of the users sends a short email to all other users with the subject "Fri mtg" and the body only says "sorry—we have an unexpected conflict Friday, can we push to Monday?". This new email may not be assigned to the topic "disclosure" because the email does not contain the word "disclosure". An activity model, on the other hand, may use the sender/recipient information to assign the email to the same activity as all the other emails that have a same or similar recipient list. That activity may also be characterized by terms such as "disclosure," "email activity patent," etc. Accordingly, a computer system may automatically assign/suggest these terms as tags for a new email, even though these terms are never mentioned in the email. In other words, if there is enough evidence from the set of users on an email, the system may automatically infer what terms this email regards. Moreover, if the content of the email may be used by the computer system to generate an activity model pertaining to an activity to which the email most likely belongs (e.g., "disclosure" or "email activity patent"), the system may automatically infer what people should likely be on a recipient list of the email (e.g., in case the email author forgets, neglects, or otherwise fails to add some important recipients).

In some examples, a latent activity model may involve probabilistic inference in graphical models that jointly captures an interplay between latent activities and the email contexts governed by the emails (e.g., documents, etc.). Such contexts may be email recipients, subject and body of the email, and so on. Model parameters may be machine learned using a maximum likelihood estimation process with an expectation maximization algorithm, for example. In some implementations, variants of the model may incorporate the recipients, co-occurrence of the recipients, and email body and subject, just to name a few examples. The model may be able to provide email recipient recommendations and may be able to identify email senders who engage in similar activities (which, in turn, may result in improvements to the recipient recommendations).

Activities may be a prominent characteristic of a workplace and may be governed by people's job roles and work responsibilities. Examples of workplace activities include organizing a conference, purchasing equipment, and managing candidate interviews, just to name a few examples.

Activities may be viewed as a collaborative work practice involving a set of people each playing a different role in the activity.

In several examples, activities may be modelled as latent probability distributions personalized to an email sender. Some variants of the activity model may incorporate email recipients, email recipient pairs (or groups) that account for co-occurrence of the email recipients, and email body and subject tokens (e.g., single words, multiple words, or combinations thereof) along with email recipient pairs (or groups). Additionally, lexical (bag of words), syntactic (nouns and verb phrases), and semantic (things of interest in an email) representations of the body and subject tokens of an email may be considered. The parameters of the generative model may be machine learned using an expectation maximization (EM) process.

In some examples, a system may suggest candidates as possible email recipients. Such a system may be used to remind an email sender about a potentially forgotten recipient(s) or to recommend the next recipient as the email sender enters recipients into a send-to list. For example, the system may prompt a user with a list of one or more potential addressees that have not (yet) been added to a list. On the other hand, such a system, may be used to suggest that a listed recipient may be included in error. For example, the system may prompt a user with the message "Are you sure you want to include John Smith as a recipient?". In various examples, a latent activity model may be applied to emails, where the contexts of the emails are governed by workplace activities. In other examples, probabilistic modeling may incorporate co-occurring recipients with lexical, syntactic, and semantic contexts of an email. In yet other examples, probabilistic modeling may incorporate any of a number of user-behavioral signals, such as time-of-day, device/app used, and/or location at time of writing an email or other communication. In still other examples, a system may identify senders engaging in similar activities using the activity model, and may provide recipient recommendations.

In some examples, activity modeling in email stems from an assumption that in a workplace (or any other environment where email may be used), people primarily use emails as a communication tool for their ongoing activities, and an email's recipient list, content, and other context are governed by a given activity. For example, an employee attending a conference may write emails to the conference organizers regarding registration or scheduling, or the employee may write mails to a hotel for booking confirmation. The communication may span multiple emails, involving many parties, while all under the same activity.

Activities may be modelled as a latent probabilistic variable over the email recipients and content, personalized to the email sender. Let D be the set of all mails in a corpus containing N emails, generated by $S=\{s_i|1 \leq i \leq S_D\}$ senders, and sent to $R=\{r_i|1 \leq i \leq R_D\}$ recipients. Let $B=\{b_i|1 \leq i \leq B_D\}$, and $T=\{t_i|1 \leq i \leq T_D\}$ represent the body and subject vocabulary of the emails respectively. Let K be the number of latent activities for each sender. Then the activities may be modelled as probability distributions over email components S, R, B, and T.

In some examples, an assumption regarding modeling activities in email is that different components of an email contain specific types of information that can help to characterize the activities that drive user behavior (e.g., where the user is a writer of the email). In a generative process of the activity model, for an email $d \in D$ (d is an element of D), a sender $s \in S$ is first generated from a multinomial. distribution with probability vector $\sigma$, then an activity a is generated from a sender-personalized multinomial distribution with probability vector $\theta_s$. Let $R_d$ is a subset of R, $B_d$ is a subset of B, and $T_d$ is a subset of T be the set of recipients, body, and subject tokens of d, respectively. The generation of the email contexts (e.g., recipients and body/subject tokens) may vary based, at least in part, on the specific design of each variant of the model. In a first simplistic model, assume that recipient $r \in R_d$, body token $b \in B_d$, and subject token $t \in T_d$ for an email may be generated from the multinomial distributions with probability vectors $\lambda_{s,a}$, $\varphi_{s,a}$, and $\tau_{s,a}$, respectively, that are conditioned on s and a. Point estimates for $\sigma$ may be directly calculated from a training corpus, whereas $\theta$, $\lambda$, $\varphi$, and $\tau$ are the unknown parameters of the model.

In a first model, herein named Rec., it is assumed that the latent activities can be learned as a probability distribution over just the email recipients. A second model, herein named CoRec, may use co-occurring recipients in generative models for emails. Co-recipients may be modelled as pairs of recipients generated from a probability distribution conditioned on the sender and the activity. A third model, herein named CoRecBT, may incorporate body and subject of emails, as described below. Other possible models may use or incorporate additional or other features of email (or other communication), and claimed subject matter is not limited to any particular example models described herein.

In the above models, a system may learn point estimates for the parameters ($\sigma$, $\theta$, $\omega$, $\varphi$, and $\tau$). One may take a Bayesian approach and treat these parameters as variables (for instance, with Dirichlet prior distributions), and perform Bayesian inference. However, exact inference may then become intractable and there may resultantly be a need to resort to methods such as variational inference or sampling, for example. Such an extension may be unnecessary if there is a sufficient amount of training data to estimate all parameters reliably. Such an approach may enable learning (and performing inference in) the model with relatively large amounts of data with reasonable computing time.

Various examples are described further with reference to FIGS. 1-13.

FIG. 1 is a block diagram depicting an environment 100 for modeling activities in email, according to various examples. In some examples, the various devices and/or components of environment 100 include distributed computing resources 102 that may communicate with one another and with external devices via one or more networks 104.

For example, network(s) 104 may include public networks such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, 5G, and so forth) or any combination thereof Network(s) 104 may utilize communications protocols, including packet-based and/or datagram-based protocols such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards. Network(s) 104 may also include network memory, which may be located in a cloud, for example. Such a cloud may be configured to perform actions based on executable code, such as in cloud computing, for example.

In various examples, distributed computing resource(s) 102 includes computing devices such as devices 106(1)-106(N). Examples support scenarios where device(s) 106 may include one or more computing devices that operate in a cluster or other grouped configuration to share resources, balance load, increase performance, provide fail-over support or redundancy, or for other purposes. Although illustrated as desktop computers, device(s) 106 may include a diverse variety of device types and are not limited to any particular type of device. Device(s) 106 may include specialized computing device(s) 108.

For example, device(s) 106 may include any type of computing device, including a device that performs cloud data storage and/or cloud computing, having one or more processing unit(s) 110 operably connected to computer-readable media 112, I/O interfaces(s) 114, and network interface(s) 116. Computer-readable media 112 may have a generative model for activities (GMA) module 118 stored thereon. For example, GMA module 118 may comprise computer-readable code that, when executed by processing unit(s) 110, operate an activity model generator. In some cases, however, a GMA module need not be present in specialized computing device(s) 108.

A specialized computing device(s) 120, which may communicate with device(s) 106 (including network storage, such as a cloud memory/computing) via networks(s) 104, may include any type of computing device having one or more processing unit(s) 122 operably connected to computer-readable media 124, I/O interface(s) 126, and network interface(s) 128. Computer-readable media 124 may have a specialized computing device-side GMA module 130 stored thereon. For example, similar to or the same as GMA module 118, GMA module 130 may comprise computer-readable code that, when executed by processing unit(s) 122, operate an activity model generator. In some cases, however, a GMA module need not be present in specialized computing device(s) 120. For example, such a GMA module may be located in network(s) 104.

Figure 2:
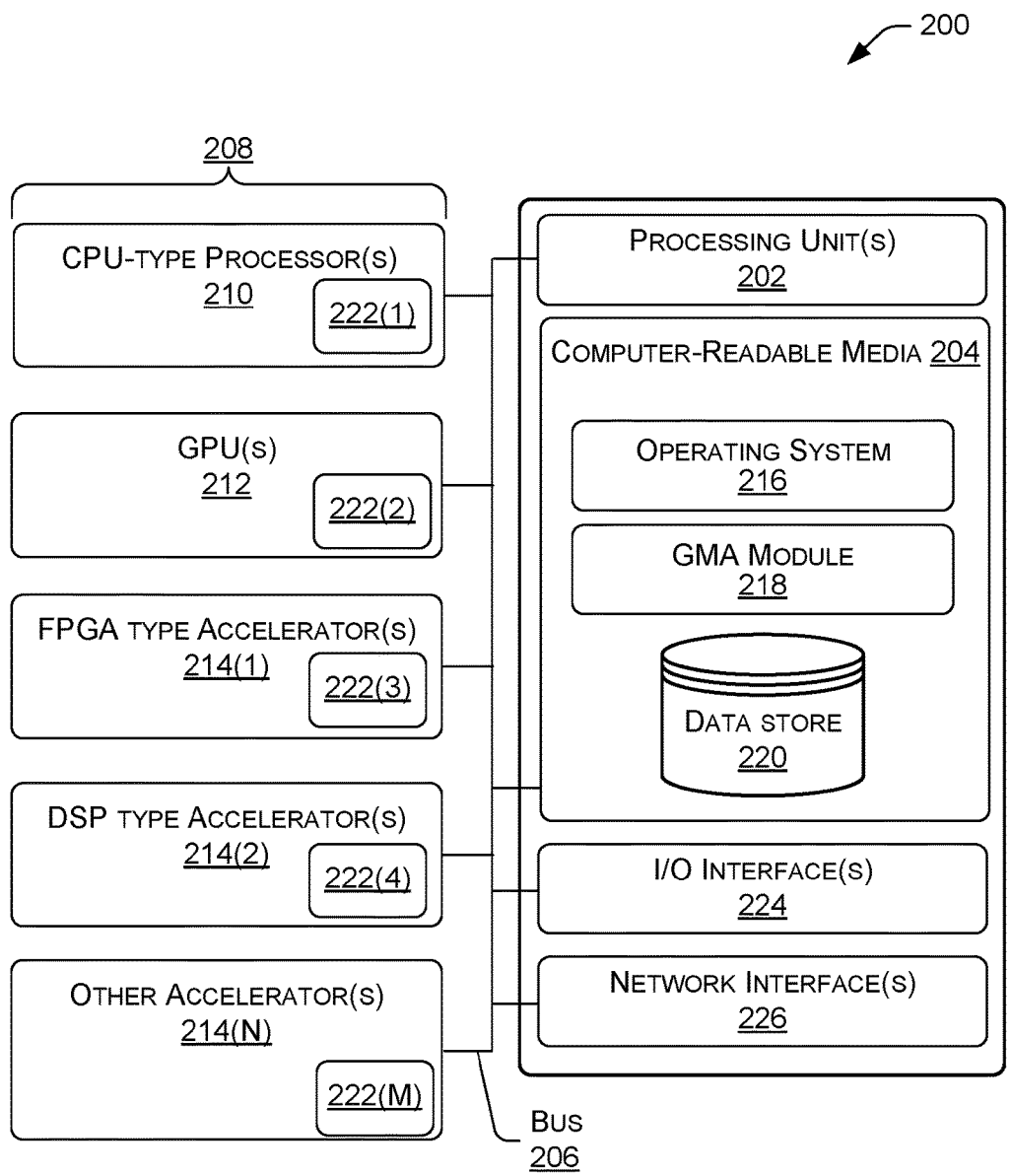
FIG. 2 is a block diagram depicting a device for modeling activities in email, according to various examples.

FIG. 2 depicts an illustrative device 200, which may represent device(s) 106 or 108, for example. Illustrative device 200 may include any type of computing device having one or more processing unit(s) 202, such as processing unit(s) 110 or 122, operably connected to computer-readable media 204, such as computer-readable media 112 or 124. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely computer storage media and communication media. Computer storage media may include volatile and non-volatile machine-readable, removable, and non-removable media implemented in any method or technology for storaae of information (in compressed or uncompressed form), such as computer (or other electronic device) readable instructions, data structures, program modules, or other data to perform processes or methods described herein. The computer-readable media 112 and the computer-readable media 124 are examples of computer storage media. Computer storage media include, but are not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media does not include communication media.

Device 200 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaining devices, work stations, media players, personal video recorders (PVRs), set-top boxes, cameras, integrated components for inclusion in a computing device, appliances, or any other sort of computing device such as one or more separate processor device(s) 208, such as CPU-type processors (e.g., micro-processors) 210, GPUs 212, or accelerator device(s) 214.

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 210, executable by a GPU 212, andlor executable by an accelerator 214, such as an FPGA type accelerator 214(1), a DSP type accelerator 214(2), or any internal or external accelerator 214(N).

Executable instructions stored on computer-readable media 202 may include, for example, an operating system 216, a GMA module 218, and other modules, programs, or applications that may be loadable and executable by processing units(s) 202, and/or 210. For example, GMA module 218 may comprise computer-readable code that, when executed by processing unit(s) 202, operate an activity model generator. In some cases, however, a GMA module need not be present in device 200.

By way of example, and not limitation, computer-readable media 204 (e.g., computer storage media) may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes the claims, the phrase "computer storage medium," "computer-readable storage medium" and variations thereof, does not include waves, signals, and/or other transitory and/or intangible communication media, per se.

Alternatively, or in addition, the functionally described herein may be performed by one or more hardware logic components such as accelerators 214. For example, and without limitation, illustrative types of hardware logic components that may be used include Field-programmable Gate Arrays (FPGAs), Application-specific Integrated Circuits (ASICs), Application-specific Standard Products (ASSPs), quantum devices, such as quantum computers or quantum annealers, System-on-a-chip systems (SOCs), Complex Programmable Logic Devices (CPLDs), etc. For example, accelerator 214(N) may represent a hybrid device, such as one that includes a CPU core embedded in an FPGA fabric.

In the illustrated example, computer-readable media 204 also includes a data store 220. In some examples, data store 220 includes data storage such as a database, data warehouse, or other type of structured or unstructured data storage. In some examples, data store 220 includes a relational database with one or more tables, indices, stored procedures, and so forth to enable data access. Data store 220 may store data for the operations of processes, applications, components, and/or modules stored in computer-readable media 204 and/or executed by processor(s) 202 and/or 210, and/or accelerator(s) 214. For example, data store 220 may store version data, iteration data, clock data, private data, voice data, and various state data stored and accessible by GMA module 218. Alternately, some or all of the above-referenced data may be stored on separate memories 222 such as a memory 222(1) on board CPU type processor 210 (e.g., microprocessor(s)), memory 222(2) on board GPU 212, memory 222(3) on board FPGA type accelerator 214(1), memory 222(4) on board DSP type accelerator 214(2), and/or memory 222(M) on board another accelerator 214(N).

Device 200 may further include one or more input/output (I/O) interface(s) 224, such as I/O interface(s) 114 or 126, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Device 200 may also include one or more network interface(s) 226, such as network interface(s) 116 or 128, to enable communications between computing device 200 and other networked devices such as other device 120 over network(s) 104 and network storage, such as a cloud network. Such network interface(s) 226 may include one or more network interface controllers (NICs) or other types of transceiver devices to send and receive communications over a network.

Figure 3:
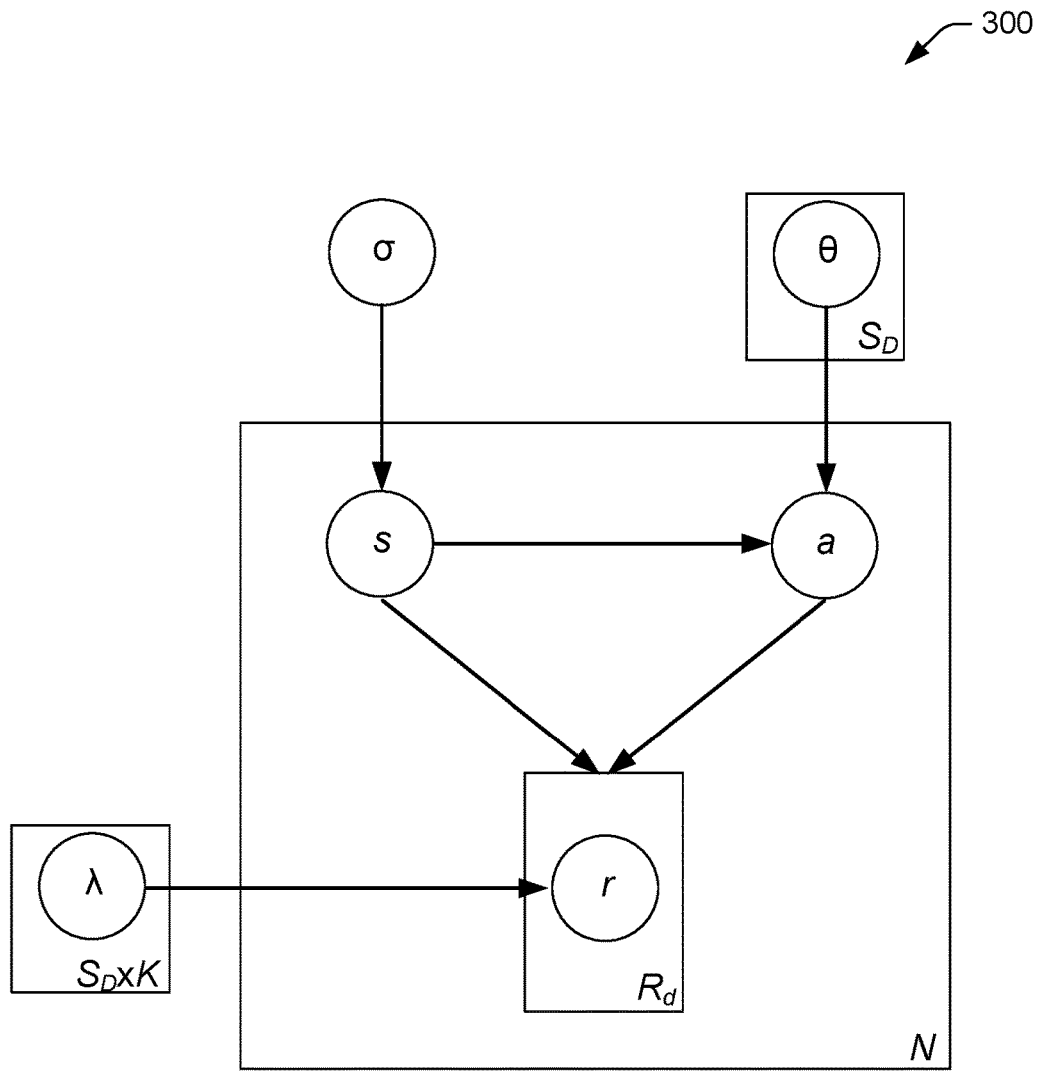
FIG. 3 is a plate diagram of an example activity model.

FIG. 3 is a plate diagram of an example activity model 300. Here, the observed quantities are a sender s and a recipient r. N is the number of emails in some email corpus D. When writing an email (or any other type of communication), a user may write (about) an activity a, recipients, and words in the subject and/or body of the mail. $S_D$ is the number of email senders (e.g., 100, etc., though claimed subject matter is not limited in this respect), $R_d$ is a list of recipients, and K is the number of activities (e.g., 20, 50, etc., though claimed subject matter is not limited in this respect). The activity may be a latent variable based, at least in part, on observed recipients and words. Such a latent variable may be translated into a generative model, such as 300, for example. Model 300 is the Rec model, mentioned above. The model assumes that latent activities can be machine learned as a probability distribution over the email recipients alone (e.g., not the email senders). The generative process is:

Model 1: Rec:
For each email document d is an element D
sender s~multinomial($\sigma$)
activity a~multinotnial($\theta_s$)
For 1 . . . |$R_d$|, recipient r~multinomial($\lambda_{s, a}$)

The joint probability of the Rec model is the product of the conditional distributions:

$$P(s, a, r|\sigma, \theta, \lambda) = P(s|\sigma) P(a|s, \theta) \Pi P(r|s, a, \lambda), \quad \text{Eqn. 1}$$

where the product $\Pi$ is taken over $r \in R_d$.

The probability of a sender s, an activity a given s, and a recipient r given s and a are defined below:

$$P(s=s') = \Pi \sigma_i^{I[i=s']}, \text{ such that } \Sigma \sigma_i = 1, \quad \text{Eqn. 2}$$

where the product $\Pi$ is taken from i=1 to $S_D$, and the sum $\Sigma$ is over i.

$$P(a=a'|s=s') = \Pi \theta_{s',i}^{I[i=a']}, \text{ such that } \Sigma \theta_{s',i} = 1, \quad \text{Eqn. 3}$$

where the product $\Pi$ is taken from i=1 to K, and the sum $\Sigma$ is over i.

$$P(r=r'|s=s') = \Pi \lambda_{s',a',i}^{I[i=r']}, \text{ such that for all s,}$$
$$a \Sigma \lambda_{s',a',i} = 1, \quad \text{Eqn. 4}$$

where the product $\Pi$ is taken from i=1 to $R_D$, and the sum $\Sigma$ is over i.

For inference, let $d^n$ be the nth email, where $d^n = \{s^n, R_D^n\}$. Bayes' rule may be applied to find the posterior distribution over the activities $P^n(a|d)$, which is directly proportional to the joint distribution $P^n(a, d)$. This distribution may be exactly computed by evaluating the joint distribution for every value of a and the observed document $d^n$.

For learning, point estimates for $\sigma$ may be directly obtained from the training corpus. The parameters $\theta$ and $\lambda$ may be estimated by maximizing the (log) probability of observing D. The log (D) can be written as:

$$\log P(D) = \Sigma \Sigma P^n(a|s, R_d) \log P^n(a, s, R_d), \quad \text{Eqn. 5}$$

where the first sum is from n=1 to N and the second sum is over a.

The expectation-maximization (EM) algorithm may be used to set the parameters. Starting with a random initialization of the parameters (with Gaussian noise), EM iterates between the expectation step in which $P^n(a|s, R_d)$ is computed for each email with fixed parameter values computed in a previous maximization step, and the maximization step in which the parameters are updated with fixed $P^n(a|s, R_d)$ values computed in the expectation step. The parameter updates may be obtained by taking the derivative of log P(D) with respect to each parameter, and setting the resultant to 0, providing us with the following parameter updates:

$$\theta_{s'n,i} = \Sigma \Sigma P^n(a|d) I[i=a] / \Sigma \Sigma P^n(a|d), \quad \text{Eqn. 6}$$

where the first summations of the numerator and denominator are each from n=1 to N and the second summations of the numerator and denominator are each over a. Also, $$\lambda_{s'n, a, i} = \Sigma \Sigma P^n(a|d) \Sigma I[i=r] / R^n_d \Sigma \Sigma P^n(a|d), \quad \text{Eqn. 7}$$

where the first summations of the numerator and denominator are each from n=1 to N, the second summations of the numerator and denominator are each over a, and the third summation in the numerator is taken over $r \in R$.

EM may be run until the change in log P(D) is less than a convergence threshold, such as $10^{-5}$, for example.

Figure 4:
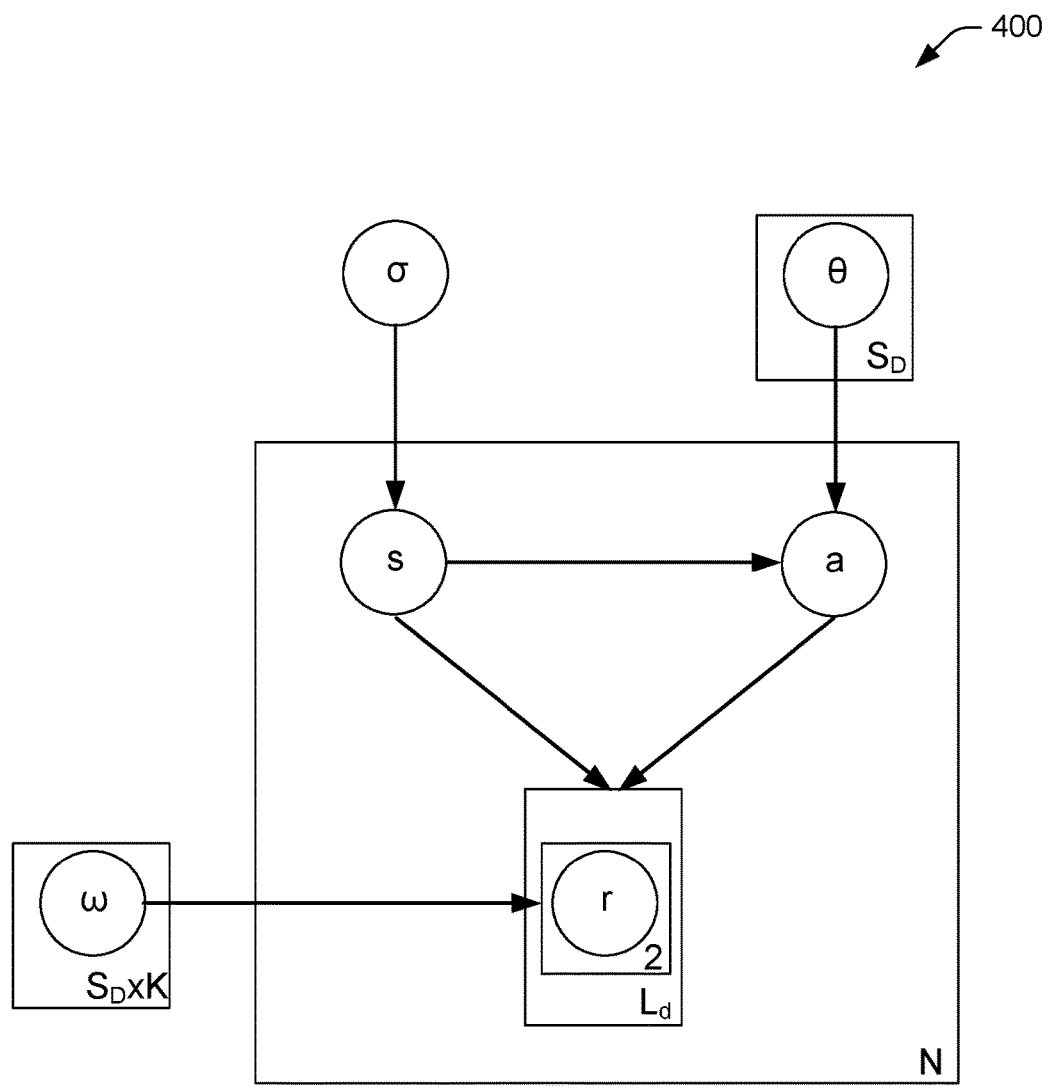
FIG. 4 is a plate diagram of another example activity model.

FIG. 4 is a plate diagram of a CoRec activity model 400, according to some examples. Here, the observed quantities are the sender s and the recipient r. The "2" in FIGS. 4 and 5 indicates a recipient pair. $L_D$ is the set of recipient pairs in email d from an email corpus D. For example, if $r_1$, $r_2$, $r_3$, $r_4$ are recipients of email d, then the set of unordered recipient pairs $L_D = \{(r_1, r_2), (r_1, r_3), (r_1, r_4), (r_2, r_3), (r_2, r_4), (r_3, r_4)\}$. In the CoRec model, co-recipients may be modelled as pairs of recipients generated from a probability distribution conditioned on the sender and the activity. Let $L=\{(r_i, r_j) | 1 \leq i \leq R_D, 1 \leq j \leq R_D\}$ having $L_D$ pairs of recipients in the corpus. For an email d, $L_D$ being a subset of L is the set of recipient pairs in d. The CoRec model first generates a sender s from the probability distribution σ, then an activity a from a distribution over latent activities $\theta_s$ personalized to s, and finally recipient pairs $r_p$ being a subset of $L_D$ from a distribution over recipient pairs $\omega_{s,a}$ conditioned on s and a. The generative process is summarized below:

Model 2: CoRec:
For each email document d
  sender s~multinomial(σ)
  activity a~multinomial($\theta_s$)
  For 1 ... |$L_d$|, recipient pair $r_p$~multinomial($\omega_{s,a}$)
The joint probability of the CoRec model is:

$$P(s, a, r|\sigma, \theta, \omega) = P(s|\sigma)P(a|s, \theta)\Pi P(r|s, a, \omega),\qquad\text{Eqn. 8}$$

where the product Π is taken over $r_p \in L_d$.

Model CoRec adds over the Rec model the probability of a recipient pair $r_p$ given s and a, defined below:

$$P(r_p = r_p'|s=s', a=a') = \Pi\, \omega_{s',a',i}^{I[i=r_p']}, \text{ such that for all } s, a, \Sigma\omega_{s',a',i} = 1,\qquad\text{Eqn. 9}$$

where the product Π is taken from i=1 to $L_D$, and the sum Σ is over i.

The EM algorithm is applied in the same way as described above for the Rec model. During the maximization step, update for θ remains the same. The update for ω is given below:

$$\omega_{s'n, a, i} = \Sigma\Sigma P^n(a|d)\Sigma I[i=r_p]/L^n_d|\Sigma\Sigma P^n(a|d),\qquad\text{Eqn. 10}$$

where the first summations of the numerator and denominator are each from n=1 to N the second summations of the numerator and denominator are each over a, and the third summation in the numerator is taken over $r_p \in L$.

Figure 5:
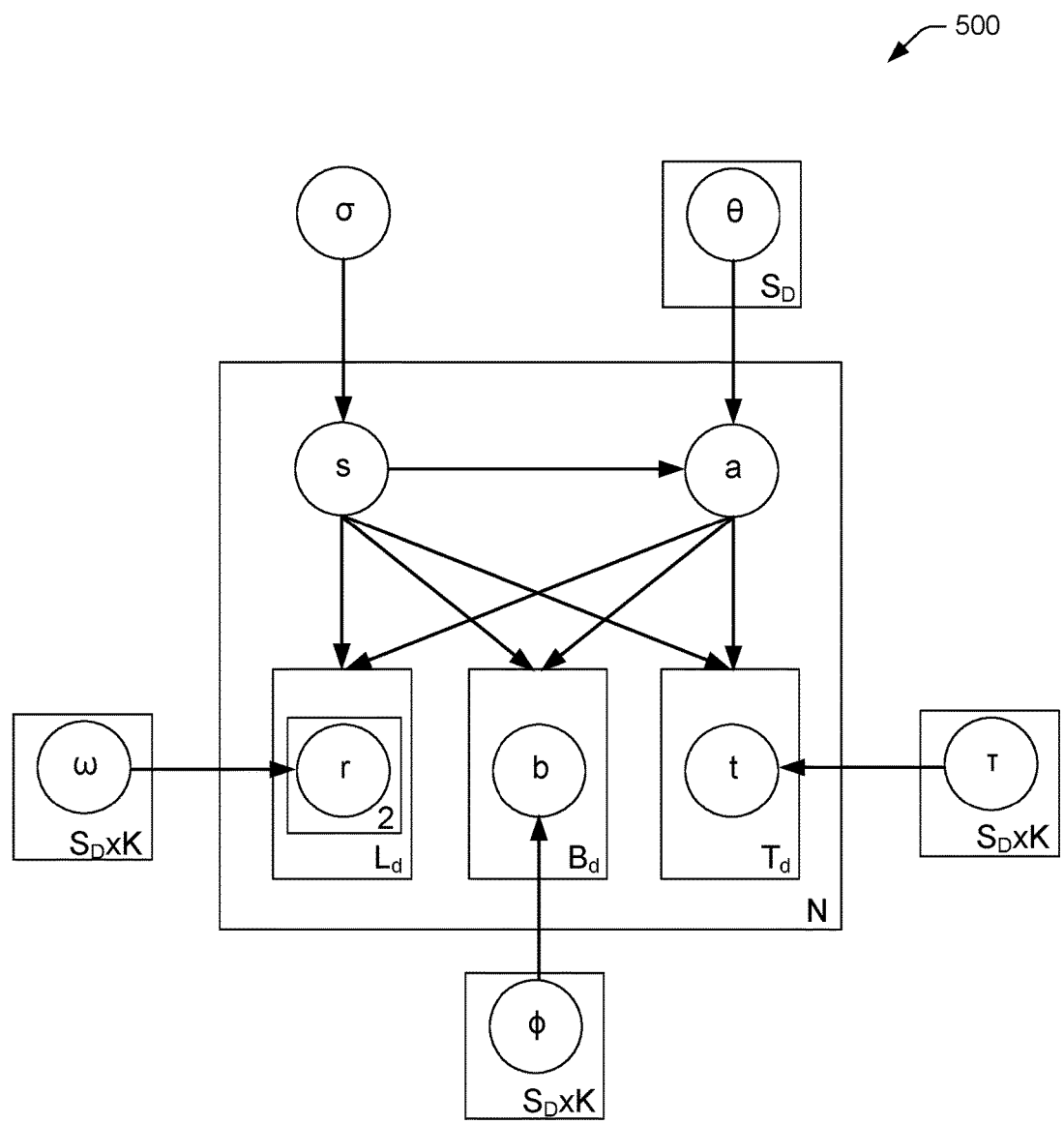
FIG. 5 is a plate diagram of another example activity model.

FIG. 5 is a plate diagram of a CoRecBT activity model 500, according to some examples. Here, the observed quantities are recipient pair b, recipient pair t, the sender s, and the recipient r. $B_d$ is a set of words (multiset) in the body component of an email d. $T_d$ is a set of words (multiset) in a subject component of the email d. The CoRecBT model further incorporates body and subject of emails. The generative process of the model is:

Model 3: CoRecBT:
For each email document d
  sender s~uitinomial(σ)
  activity a~multinomial($\theta_s$)
  For 1 ... |$L_d$|, recipient pair $r_p$~multinomial($\omega_{s,a}$)
  For 1 ... |$B_d$|, recipient pair b~multinomial($\varphi_{s,a}$)
  For 1 ... |$T_d$|, recipient pair t~multinoinial($\tau_{s,a}$)
The joint probability of the CoRecBT model is:

$$P(s, a, r_p, b, t|\sigma, \theta, \omega, \varphi, \tau) = P(s|\sigma) P(a|s,\theta)\Pi P(r_p|s, a, \omega)\Pi P(b|s, a, \varphi)\Pi P(t|s, a, \tau),\qquad\text{Eqn. 11}$$

where the first product Π is taken over $r_p \in L_d$, the second product Π is taken over $b \in B_d$, and the third product Π is taken over $t \in T_d$, and where the probability of a body token b and subject token t given s and a defined as:

$$P(b=b'|s=s', a=a') = \Pi\, \varphi_{s',a',i}^{I[i=b']},$$

$$P(t=t'|s=s', a=a') = \Pi\, \tau_{s',a',i}^{I[i=t']},$$

such that for all s, a, $\Sigma\varphi_{s, a, i} = 1$, and $\Sigma\tau_{s, a, i} = 1$  Eqns. 12 where the first product Π is taken from i=1 to B, the second product Π is taken from i=1 to T and the sums Σ are each over i. A token is one word or multiple words that act as a single word or term (e.g., each of "new", "York", and "N.Y." is an example token).

During the maximization step of the EM algorithm, updates for θ and ω remain the same as the CoRec model. The updates for φ and τ are given below:

$$\varphi_{s'n, a, i} = \Sigma\Sigma P^n(a|d)\Sigma I[i=b]/B^n_d|\Sigma\Sigma P^n(a|d),\qquad\text{Eqn. 13}$$

$$\tau_{s'n, a, i} = \Sigma\Sigma P^n(a|d)\Sigma I[i=t]/T^n_d|\Sigma\Sigma P^n(a|d),\qquad\text{Eqn. 14}$$

where the first summations of the numerator and denominator are each from n=1 to N, the second summations of the numerator and denominator are each over a, the third summation in the numerator of the first equation is taken over b ∈ B, and the third summation in the numerator of the second equation is taken over t ∈ T.

Figure 6:
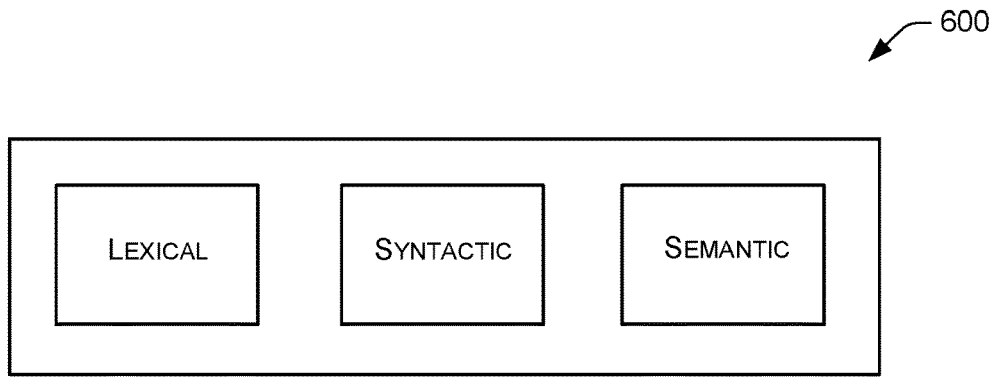
FIG. 6 is a block diagram of various linguistic representations of email content, according to various examples.

FIG. 6 is a block diagram 600 of various linguistic representations of email content or content of other types of communications text, voice mail, Skype®, chats, etc.), according to examples.

In some examples, such content may be represented by various linguistic representations. A lexical representation may comprise a bag of words (BOW) from the body of an email and subject of the email. A syntactic representation may use heuristics on the output of a Penn Tree Bank (PTB) constituent parser, identifying nouns (N) arid verb phrases (VP) in the email body and subject. A semantic representation may be used to represent or identify phrases in em.ails that represent topics, concepts, and/or entities discussed in the emails. To extract these key phrases, web search queries may be used as a source of information.

Using queries as a dictionary of possible key phrases may be useful but may have limited coverage since many topics/concepts are discussed in emails but sometimes absent or not widely available in web search queries. Instead of using queries directly, they can be used to construct a training set of key phrases and their content and a discriminative model can be trained to identify the key phrases. Each query may be treated as a key phrase and the surrounding text from web results may be treated as context. A sample of hundreds of thousands of search queries from the usage logs of a commercial web search engine may be used. In some particular implementations, only queries tagged as English and from the U.S. locale may be retained to remove geographic or linguistic variations. Queries may be kept only if they have been submitted by at least a hundred or so different users in one month, for example. For each query, the text from the web page that is most relevant to the query and that contains the exact query text may be collected as the context for the query. Relevance may be estimated by the percentage of time the page has received a long dwell time click (greater than 30 seconds) for the query, for example. If no relevant pages exist, the query may be ignored. To generate negative examples, random n-grams may be extracted from web pages. In some particular implementations, a large number of features may be considered, such as the first word of the phrase, the last word of the phrase, n-gram features (e.g., n=1 to 3), the word right before/after the phrase, the part-of-speech tag of the first word in the phrase, the part-of-speech tag of the last word in the phrase, n-gram features (e.g., n=1 to 3) over the sequence of part-of-speech tags representing the phrase, the part-of-speech tags of the word right before/after the phrase, phrase length, how many times the phrase appeared in the body/title, and the relative location of the first occurrence of the phrase in the body. A logistic regression classifier may be trained using these features and such information as listed above, for example.

Figure 7:
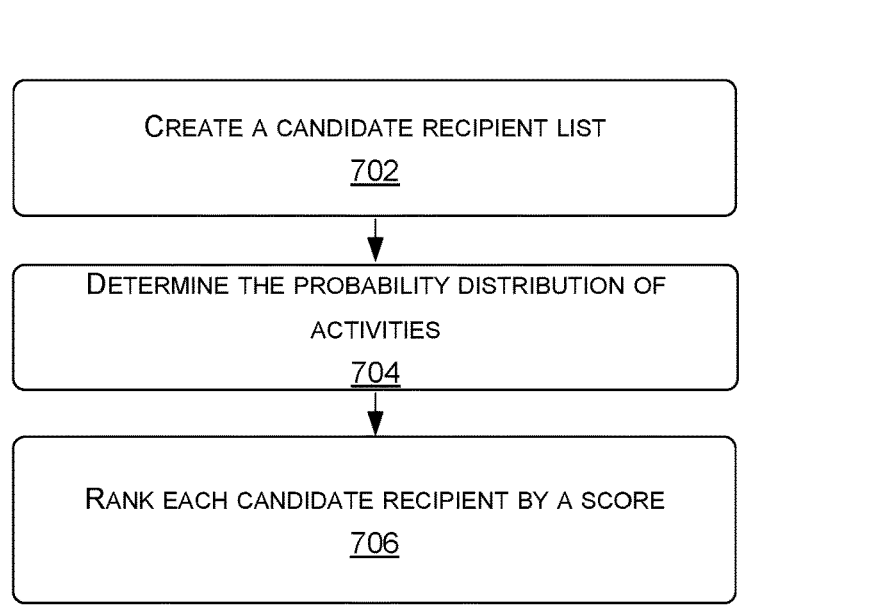
FIG. 7 is a flow diagram illustrating a process for formulating a recipient recommendation task, according to some examples.

FIG. 7 is a flow diagram illustrating a process 700 for formulating a recipient recommendation task, according to some examples. A computer system (e.g., 200 or processing unit(s) 110, 122, and 202) may perform the process for example. Such a process may be useful for evaluating the effectiveness of an activity model. To set the stage for such a task, the system may consider the following variables. For a test email document d containing the list of recipients $R_d$, a modified list of recipients $R_d^*$ may be created by removing the last recipient $r^* \in R_d$. Given d with $R_d^*$, the task objective is to recommend r as the next recipient for d, for example.

In 702, to recommend a recipient for a test email document d written by sender $s_d$, the system may create a candidate recipient list by combining recipients who received an email from $s_d$, and recipients who co-occurred with an observed recipient $r \in R_d^*$ in the training corpus. Sender $s_d$ and any $r \in R_d^*$ may be excluded from the candidate list. Next, in 704, the system may determine the probability distribution of activities in d using:

$$P(a|d)=P(s, a, d|\sigma, \theta, \omega, \varphi, \tau)/\Sigma P(s, a, d|\sigma, \theta, \omega, \varphi, \tau),$$ Eqn. 15 where the summation is taken over a.

In 706, using a score, the system may then rank each candidate recipient $r^*$. The system may arrive at such a score by using two different methods defined below. The ranked list is used as a final list of recommended recipients. The two scoring methods are called the Reg method and the Sim method.

In the Reg method, scoring may use the chain rule:

$$P(r^*|d) \text{ is proportional to } \Sigma P(a|d)\Pi P(r^*, r|s, a),$$ Eqn. 16 where the summation is taken over a and the product is over $r \in R_d$.

The above function of Eqn. 16 may be smoothed using the following linear interpolation:

$$P(r^*, r|a, s)=\alpha_1 \times P(r^*, r|a, s)+\alpha_2 \times P(r^*, r)+(1-\alpha_2)\times P(r_{rare}))$$ Eqn. 17

Here, $P(r_{rare})$ is the lowest probability of any recipient in the training data. calculate $\alpha_1$ with a sigmoid logistic function, allowing the system to determine when to rely more on the learned probabilities:

$$\alpha_i=(1+e^{-k(x-x0)})^{-1}$$ Eqn. 18

For $\alpha_1$, x is the pointwise mutual information (PMI) between s and r in training data, with steepness parameter k=50, for example. For $\alpha_2$, x is the frequency of r in training data, with k=0.5. Sigmoid's midpoint $x_0$ is the first quartile (Q1) of the PMI and recipient frequency distributions respectively. In this example, the above values for k have been determined from the shape of the sigmoid curves in the training data.

In the Sim method, the activity model may be used to identify other senders with similar activities as $s_d$, who may be referred to as similar senders, $S_d^*$. To identify the similar senders, the system may evaluate senders who maximize the log likelihood of the test document d by calculating log P(s, d) for all $s \in S$, and identify the top five or so senders (for example) with the highest scores to add to $S_d^*$. The observed sender $s_d$ need not be included in $S_d^*$. The system then calculates $P(r^*|d)$ for each $s \in S_d^*$ using the Reg method, along with a weight $w_s$:

$$w_s=\log P(s, d)/\Sigma \log P(s, d),$$ Eqn. 19 where the summation is taken over $s \in S_d^*$.

The final scoring function for the Sim method is:

$$P(r^*|d)=\alpha P_{sd}(r^*|d)+(1-\alpha)\Sigma \omega_s P_s(r^*|d),$$ Eqn. 20 where the summation is taken over $s \in S_d^*$.

In a particular implementation, $\alpha$ is determined with the frequency of $s_d$ in training data, using the sigmoid function with k=0.5 and $x_0$ as the Q1 of the frequency distribution.

Figure 8:
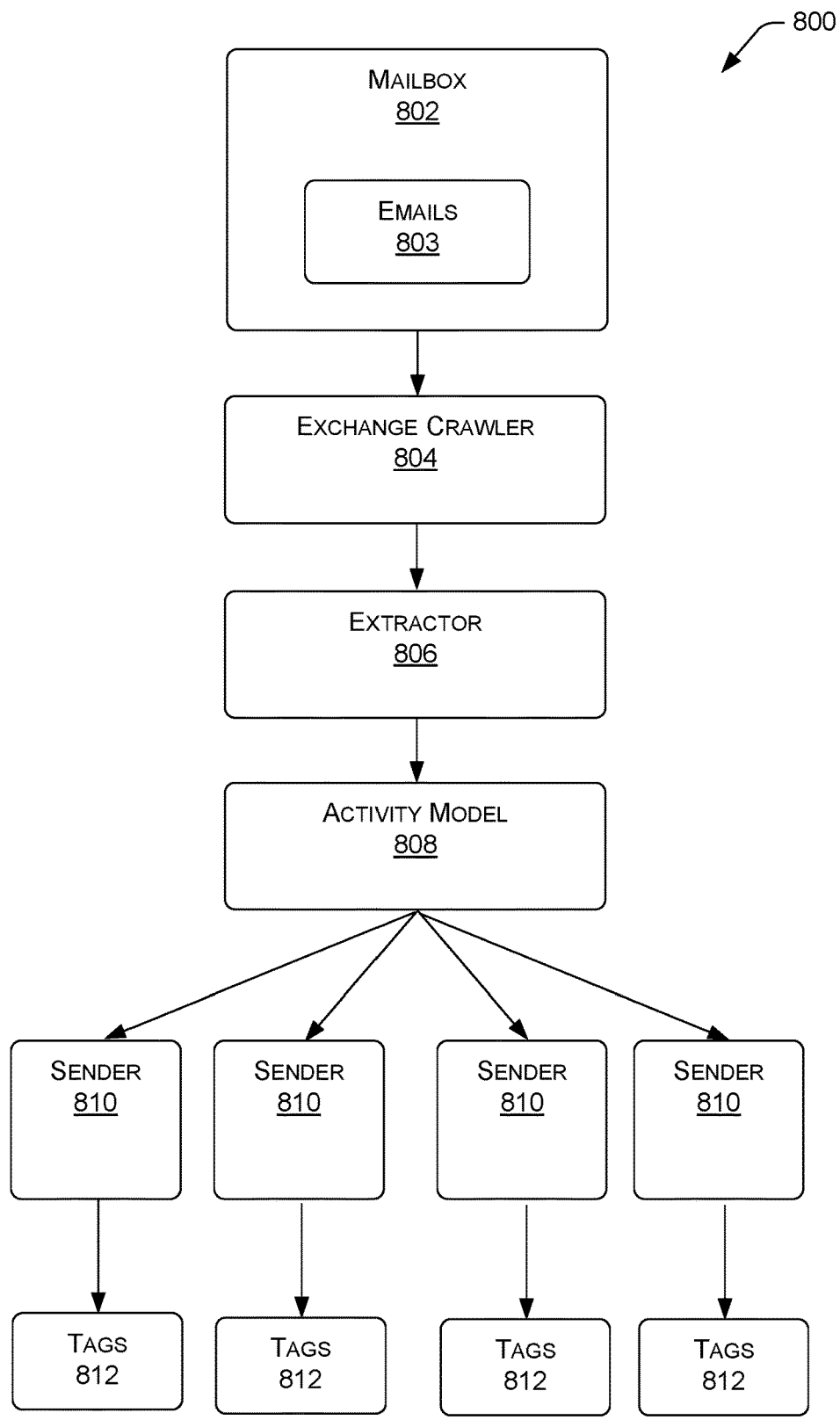
FIG. 8 is a flow diagram illustrating a process for building an offline model for activities associated with email, according to some examples.
Figure 9:
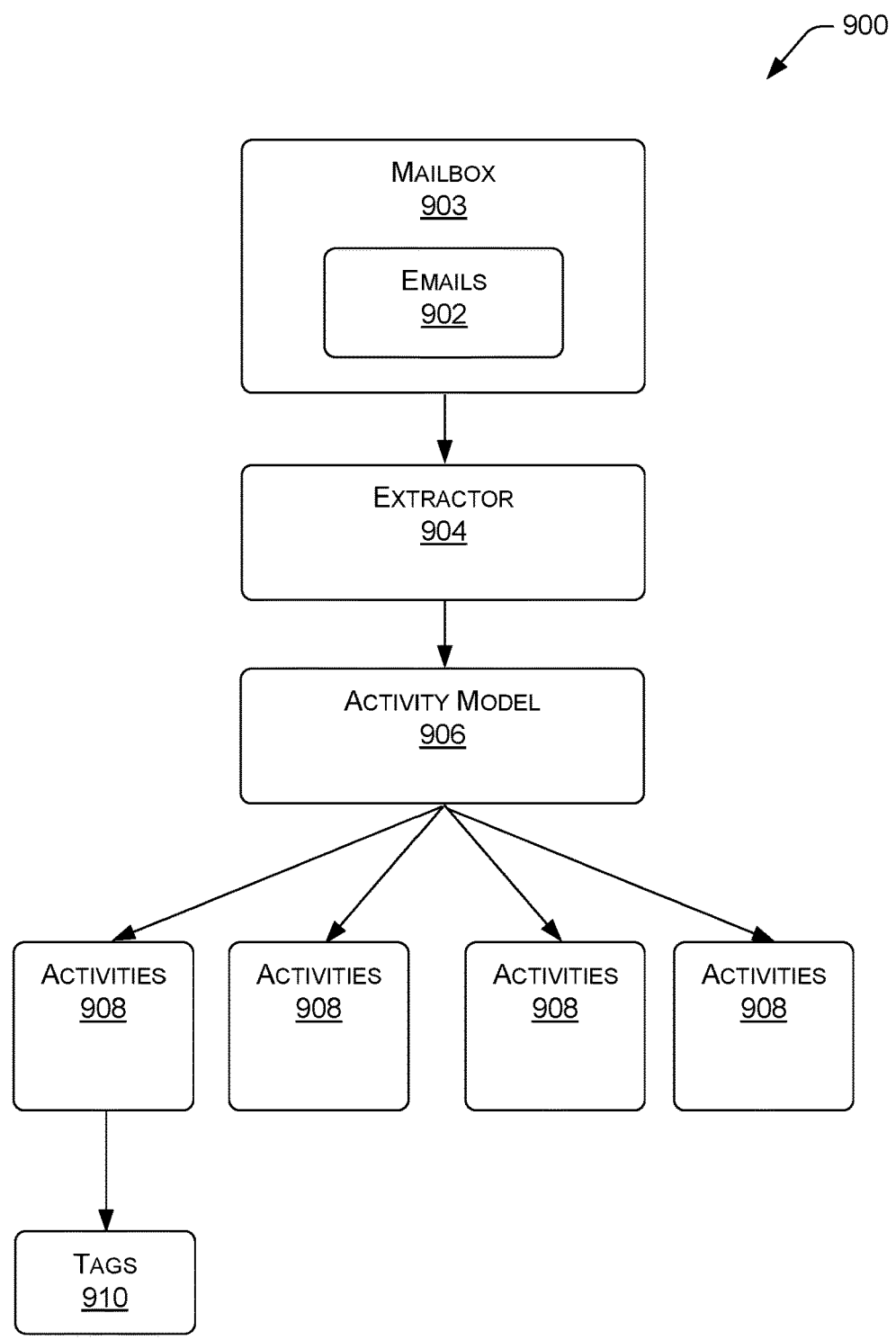
FIG. 9 is a flow diagram illustrating a process for applying a model for activities associated with email, according to some examples.
Figure 10:
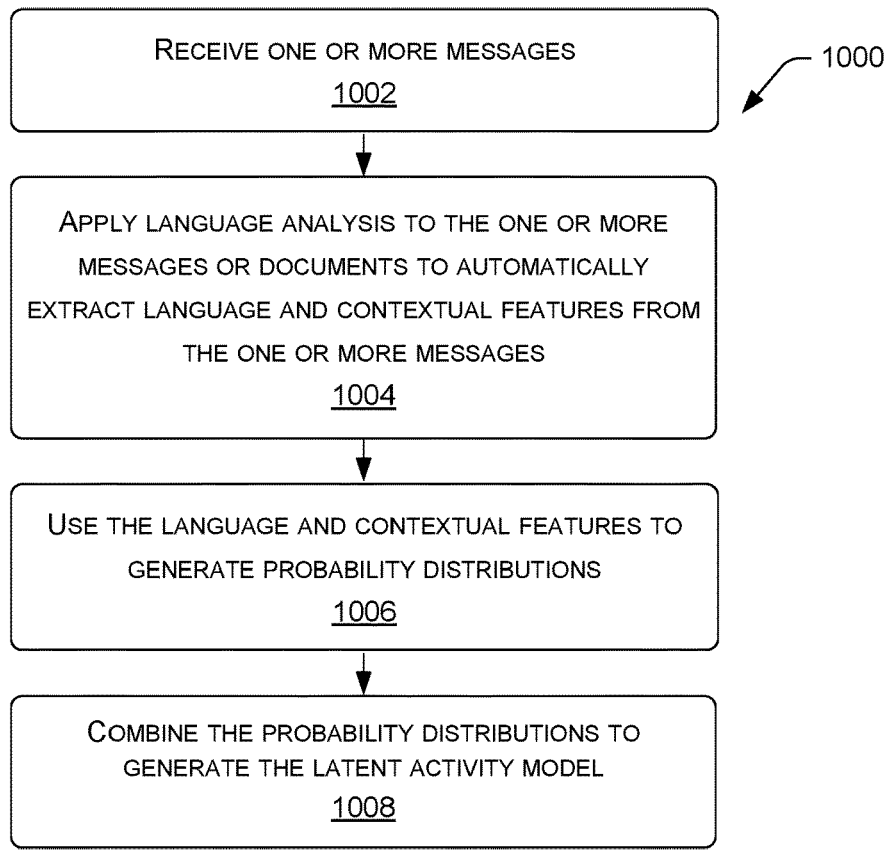
FIG. 10 is a flow diagram illustrating a process for building a model for activities associated with email, according to some examples.

FIGS. 8-10 illustrate processes that use an activity model, such as activity model 500, to automatically generate hashtags for an email that a given user u is composing or receiving, based on the most likely activity associated with that email.

FIG. 8 is a flow diagram illustrating a process 800 for building an offline model for activities associated with email, according to some examples. Such a process may be performed by a computer system (e.g., 200 or processing unit(s) 110, 122, and 202), for example.

To build the activity model offline, the system may crawl a mailbox 802 (or collection of other type of communication) of a user u and collect emails 803 from and to user u using an exchange crawler 804. The system may extract a set of features from the subject (e.g., title) and body of the emails (e.g., the feature sets, but any combination of text features may be considered). An extractor 806 may extract verb phrases using a part-of-speech tagger and may extract noun phrases using a part-of-speech tagger.

On this set of emails, with the extracted text features, the system may train an activity model 808 for u. The trained activity model provides a set of activities for each sender 810, where each activity may be defined by probability distributions over the features in the subject and title, as well as senders and recipient pairs. For each activity, the system can use the top n most likely text features for that activity as a candidate for a tag 812 for user (sender) emails belonging to that activity.

FIG. 9 is a flow diagram illustrating a process 900 for applying a model for activities associated with email 902 (or other type of communication), according to some examples. Such a process may be performed by a computer system (e.g., 200 or processing unit(s) 110, 122, and 202), for example.

To use the activity model online, the system may extract a set of features from the subject (e.g., title) and body of emails of a mailbox 903. An extractor 904 may extract verb phrases using a part-of-speech tagger and may extract noun phrases using a part-of-speech tagger.

At runtime, for a message that user u is composing or receiving, activity model 906 may be applied to the extracted text features, as well as to the sender, and the recipient pairs on that email. The result is a distribution over activities 908 for this email. The system may use the top n most likely text features for the most likely activity (or maybe the top 2 or 3 most likely activities if there is no clear most-likely "winner") and offer the text features as suggestions for tags 910 to the user, for example.

FIGS. 10-13 are flow diagrams illustrating processes. The flows of operations illustrated in FIGS. 10-13 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIGS. 10-13 may represent modules, segments, or portions of code that include one or more executable instructions for implementing specific logical functions or variables in the process.

FIG. 10 is a flow diagram illustrating a process for building a latent activity model for activities associated with email, according to some examples. Process 1000 may be performed by a processor, such as processing unit(s) 110, 122, and 202, of a computer system, for example. At block 1002, the processor may receive one or more electronic messages. For example, such messages may be emails, chats, voice messages, texts, documents attached to emails or other messages, and so on. In some examples, the processor may receive the one or more electronic messages from a source external to the computer system. In this case, an electronic message has been sent to the computer system. In other examples, the processor may receive the one or more electronic messages from an internal source. In this case, an electronic message may be generated via a user interface of the computer system. For example, a user of the computer system may be writing an email and the processor "receives" the email as it is being written (e.g., in real time).

At block 1004, the processor may apply language analysis to the one or more messages to automatically extract language and contextual features from the one or more messages. For example, elements of block diagram 600 of various linguistic representations of email content or content of other types of communications may be applied to the one or more messages. In a particular example, the processor may extract syntactic and semantic meanings from recipient names or subject titles of the one or more messages. At block 1006, the processor may use the language features to generate probability distributions. At block 1008, the processor may combine the probability distributions to generate the latent activity model. In other words, the latent activity model may be a combination of any of a number of the probability distributions.

Figure 11:
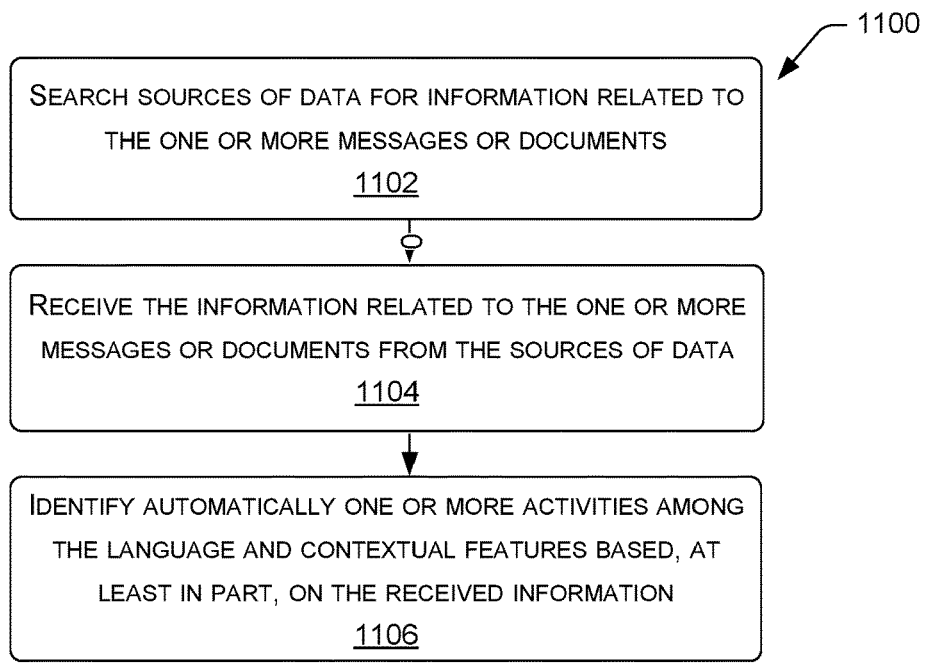
FIG. 11 is a flow diagram illustrating an additional process for building a model for activities associated with email, according to some examples.

FIG. 11 is a flow diagram illustrating a process 1100 that may follow process 1000. At block 1102, the processor may search sources of data for information related to the one or more messages or documents. Such sources may be emails (which may be archived in a memory) from one or more users, or may be archive information about one or more aspects of authors of the respective one or more messages or documents. Such aspects may include personal information, work information, historical behaviors, and so on. In some examples, users may select or limit types of personal information to be archived or considered. At block 1104, the processor may receive the information related to the one or more messages or documents from the sources of data. At block 1106, the processor may identify automatically one or more activities among the language and contextual features based, at least in part, on the received information.

Figure 12:
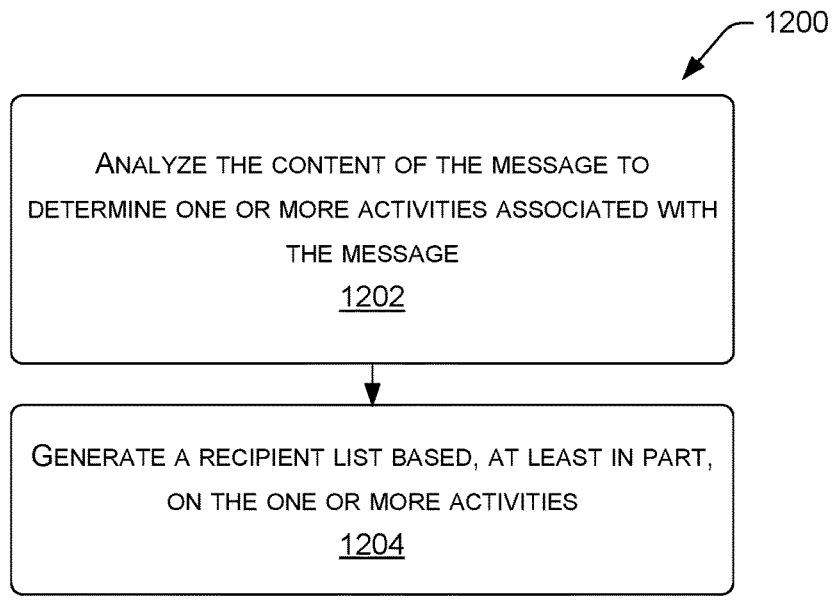
FIG. 12 is a flow diagram illustrating a process for building a recipient list for a message based on activities associated with the message, according to some examples.

FIG. 12 is a flow diagram illustrating a process 1200 for building a recipient list for a message based on activities associated with the message, according to some examples. Such a recipient list may also be called a "send-to" list. In some cases, such a list may be the addressee field of an email, such as the main field, the "cc" filed, or the "bcc" field. Process 1200 may be performed by a processor, such as processing unit(s) 110, 122, and 202, of a computer system, for example. At block 1202, the processor may analyze the content of the message to determine one or more activities associated with the message. At block 1204, the processor may generate a recipient list based, at least in part, on the one or more activities.

Figure 13:
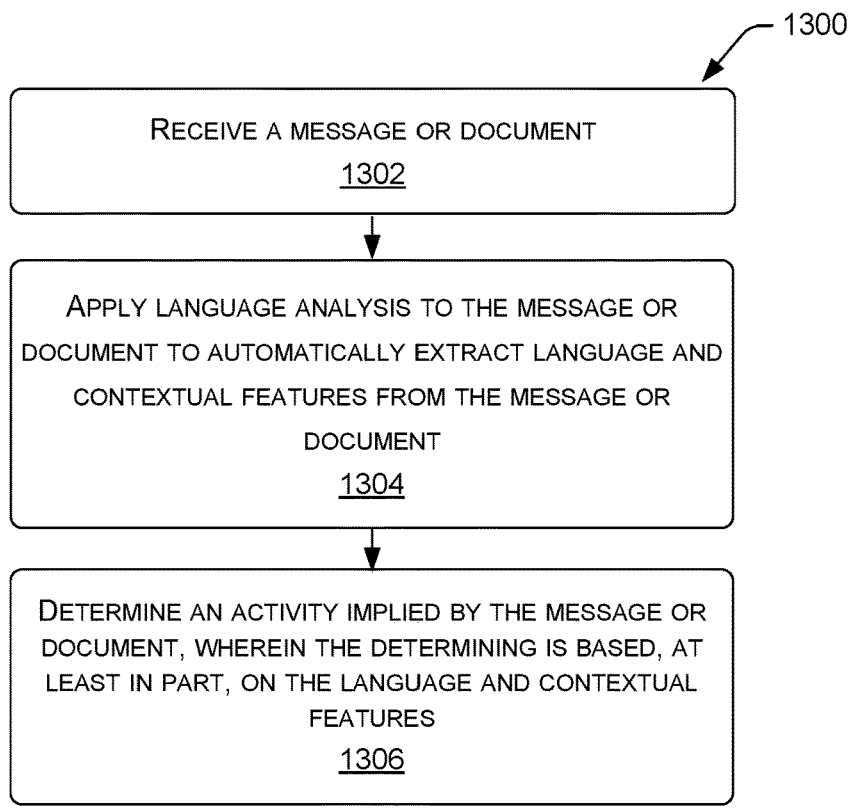
FIG. 13 is a flow diagram illustrating a process for determining an activity associated with a message or document, according to some examples.

FIG. 13 is a flow diagram illustrating a process 1300 for determining an activity associated with a message or document, according to some examples. Process 1300 may be performed by a processor, such as processing unit(s) 110, 122, and 202, of a computer system, for example. At block 1302, the processor may receive a message or document. In some cases, the message or document may be related to a meeting(s). For example, a message or document may be a meeting invitation (e.g., associated with calendar entries) that includes a subject title, a body (e.g., such as in an email), and attendees/organizer/location information. At block 1304, the processor may apply language analysis to the message or document to automatically extract language and contextual features from the message or document. At block 1306, the processor may determine an activity implied by the message or document, wherein the determining is based, at least in part, on the language and contextual features. For example, the message or document may imply an activity without actually having the word or term for the activity (e.g., any word or term for the activity may be the same as having a direct meaning for the activity. Here, "direct meaning" of a word or term means, for example, a definition for the word or term that can be found in a dictionary. For example, the direct meaning of the activity "interview" may be "meeting of people face to face.") Thus, for example, a message or document may imply the activity "interview" without having the word "interview." Instead, the message or document may have contextual features that imply the activity "interview." For example, an email may imply this activity by saying :"Let's reserve room 327 for a meeting with the candidate."

EXAMPLE CLAUSES

A. A method for generating a latent activity model, the method comprising: receiving one or more electronic messages or documents; applying language analysis to the one or more electronic messages or documents to automatically extract language and contextual features from the one or more electronic messages or documents; using the language and contextual features to generate probability distributions; and combining the probability distributions to generate the latent activity model.

B. The method as claim A recites, wherein automatically extracting language and contextual features from the one or more electronic messages or documents comprises extracting syntactic and semantic meanings from recipient names, massage body, or subject titles of the one or more electronic messages or documents.

C. The method as claim A recites, wherein the one or more electronic messages or documents are emails.

D. The method as claim A recites, wherein the one or more electronic messages or documents are based, at least in part, on an audio or video message.

E. The method as claim A recites, further comprising searching sources of data for information related to the one or more electronic messages or documents; receiving the information related to the one or more electronic messages or documents from the sources of data; and identifying automatically one or more activities among the language and contextual features based, at least in part, on the received information.

F. The method as claim E recites, wherein the sources of data related to the one or more electronic messages or documents comprise emails.

G. The method as claim E recites, wherein the sources of data related to the one or more electronic messages or documents comprise archive information about one or more aspects of authors of the respective one or more electronic messages or documents.

H. The method as claim E recites, wherein the one or more electronic messages or documents are a first set of emails and the sources of data related to the one or more electronic messages or documents are a second set of emails.

I. The method as claim A recites, further comprising: applying the latent activity model to generate a list of email recipients that are likely associated with an activity related to the one or more electronic messages or documents.

J. :A system comprising: a receiver port to receive content of an message; one or more processors; and memory storing instructions that, when executed by the one or more processors, configure the one or more processors to perform operations comprising: analyzing the content of the electronic message to determine one or more activities associated with the electronic message; and generating a recipient list based, at least in part, on the one or more activities.

K. The system as claim J recites, wherein the electronic message is an email, and wherein the content of the email is one or more of an email recipient list of the email, a subject title of the email, or a message field of the email.

L. The system as claim J recites, wherein the electronic message is being drafted by a user of the system, the operations further comprising: generating a recommendation for adding an addressee to a send-to list of the electronic message, wherein the recommendation is based, at least in part, on the recipient list; and displaying the recommendation to the user.

M. The system as claim J recites, wherein the electronic message is being drafted by a user of the system, the operations further comprising: receiving, from the user, an addressee in a send-to list for the electronic message; generating a recommendation for deleting the addressee from the send-to list, wherein the recommendation is based, at least in part, on the recipient list; and displaying the recommendation to the user.

N. A method comprising: receiving an electronic message or document; applying language analysis to the electronic message or document to automatically extract language and contextual features from the electronic message or document; and determining an activity implied by the electronic message or document, wherein the determining is based, at least in part, on the language and contextual features.

O. The method as claim N recites, wherein the electronic message or document does not include a word directly meaning the activity.

P. The method as claim N recites, wherein the electronic message or document is a chat.

Q. The method as claim N recites, wherein automatically extracting language and contextual features from the electronic message or document comprises extracting syntactic and semantic meanings from recipient names or subject title of the electronic message or document.

R. The method as claim N recites, further comprising: searching sources of data for information related to the electronic message or document; receiving the information related to the electronic message or document from the sources of data; and identifying automatically one or more experts of the activity associated with the electronic message or document based, at least in part, on the received information.

S. The method as claim N recites, wherein the determining the activity is further based, at least in part, on a pairing or grouping of addressees of the electronic message or document.

T. The method as claim N recites, further comprising tagging the electronic message or document based, at least in part, on the determined activity.

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing, the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "may," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed is:

1. A method for generating a latent activity model, the method comprising:
   receiving one or more electronic messages or documents;
   applying language analysis to the one or more electronic messages or documents to automatically extract language and contextual features from the one or more electronic messages or documents;
   using the language and contextual features to generate probability distributions;
   combining the probability distributions to generate the latent activity model;
   receiving a first list of email recipients for an unsent email from an email client;
   generating, by applying the latent activity model to the first list of email recipients and a body of the unsent email, a second list of email recipients that are likely associated with an activity related to the unsent email, wherein the first list of email recipients are not within the second list of email recipients; and
   providing the second list of email recipients to the email client.

2. The method of claim 1, wherein automatically extracting language and contextual features from the one or more electronic messages or documents comprises extracting syntactic and semantic meanings from recipient names, message sub, or subject titles of the one or more electronic messages or documents.

3. The method of claim 1, wherein the one or more electronic messages or documents are emails.

4. The method of claim 1, wherein the one or more electronic messages or documents are based, at least in part, on an audio or video message.

5. The method of claim 1, further comprising
   searching sources of data for information related to the one or more electronic messages or documents;
   receiving the information related to the one or more electronic messages or documents from the sources of data; and
   identifying automatically one or more activities among the language and contextual features based, at least in part, on the received information.

6. The method of claim 5, wherein the sources of data related to the one or more electronic messages or documents comprise emails.

7. The method of claim 5, wherein the sources of data related to the one or more electronic messages or documents comprise archive information about one or more aspects of authors of the respective one or more electronic messages or documents.

8. The method of claim 5, wherein the one or more electronic messages or documents are a first set of emails and the sources of data related to the one or more electronic messages or documents are a second set of emails.

9. The method of claim 1, further comprising:
   determining an activity implied by the unsent email using the latent activity model; and
   tagging the unsent email with an indication of the activity.

10. The method of claim 9, wherein the unsent email does not include a word directly meaning the activity.

11. The method of claim 9, wherein automatically extracting language and contextual features from the electronic message or document comprises extracting syntactic and semantic meanings from recipient names or a subject of the unsent email.

12. The method of claim 9, further comprising:
    searching sources of data for information related to the unsent email;
    receiving the information related to the unsent email from the sources of data; and
    identifying automatically one or more experts of the activity associated with the unsent email based, at least in part, on the received information.

13. The method of claim 9, wherein the determining the activity is further based, at least in part, on a pairing or grouping of addressees of the electronic message or document.

14. The method of claim 1, further comprising:
    determining, by applying the latent activity model to the first list of email recipients, a suggested subject for the unsent email;
    providing the suggested subject;
    receiving a confirmation of the suggested subject; and
    adding the suggested subject as the subject to the unsent email.

15. The method of claim 14, further comprising:
    determining, by applying the latent activity model to the first list of email recipients and the suggested subject, an erroneous recipient from the first list of email recipients;
    providing the erroneous recipient;
    receiving a confirmation of the erroneous recipient; and
    removing the erroneous recipient from the unsent email.

16. The method of claim 14, further comprising:
    determining a time of day associated with a writing time of the unsent email; and
    determining a location associated with a writing location of the unsent email, wherein the time of day and the location are inputs to applying the latent activity model.

17. A system comprising:
    a receiver port to receive content of an message;
    one or more processors; and
    memory storing instructions that, when executed by the one or more processors, configure the one or more processors to perform operations comprising:
       applying language analysis to the one or more electronic messages or documents to automatically extract language and contextual features from the one or more electronic messages or documents;
       using the language and contextual features to generate probability distributions;
       combining the probability distributions to generate the latent activity model;
       receiving, from an email client, a first list of email recipients for an unsent email;
       generating, by applying the latent activity model to the first list of email recipients and a body of the unsent email, a second list of email recipients that are likely associated with an activity related to the unsent email, wherein the first list of email recipients are not within the second list of email recipients; and
       providing the second list of email recipients to the email client.

18. The system of claim 17, the operations further comprising:
    receiving, from the user, an addressee in a send-to list for the unsent email;
    generating a recommendation for deleting the addressee from the send-to list, wherein the recommendation is based, at least in part, on the first list of email recipients; and
    displaying the recommendation to the user.

19. The system of claim 18, wherein the operations further comprise:
- determining, by applying the latent activity model to the first list of email recipients, a suggested subject for the unsent email;
- providing the suggested subject;
- receiving a confirmation of the suggested subject; and
- adding the suggested subject as the subject to the unsent email.

20. The system of claim 19, wherein the operations further comprise:
- determining a time of day associated with a writing time of the unsent email; and
- determining a location associated with a writing location of the unsent email, wherein the time of day and the location are inputs to applying the latent activity model.

* * * * *